US012793662B2

(12) United States Patent
Hsieh et al.

(10) Patent No.: US 12,793,662 B2
(45) Date of Patent: Nov. 10, 2026

(54) POWER LEVELS OF LIGHT-EMITTING DIODES DRIVERS

(71) Applicant: Hewlett-Packard Development Company, L.P., Spring, TX (US)

(72) Inventors: Hsing-Hung Hsieh, Taipei (TW); Kai-Chun Tai, Taipei (TW); Chia-Cheng Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/864,658

(22) PCT Filed: May 12, 2022

(86) PCT No.: PCT/US2022/029041

§ 371 (c)(1),
(2) Date: Nov. 11, 2024

(87) PCT Pub. No.: WO2023/219624

PCT Pub. Date: Nov. 16, 2023

(65) Prior Publication Data

US 2025/0308470 A1 Oct. 2, 2025

(51) Int. Cl.
*G09G 3/34* (2006.01)

(52) U.S. Cl.
CPC ......... *G09G 3/342* (2013.01); *G09G 2320/02* (2013.01); *G09G 2320/0686* (2013.01); *G09G 2330/021* (2013.01)

(58) Field of Classification Search
CPC ............... G09G 3/342; G09G 2320/02; G09G 2320/0686; G09G 2330/021; G09G 2310/0232; G09G 2310/066; G09G 2320/0233; G09G 2320/0252; G09G 2320/0646; G09G 2360/16; G09G 3/3426
See application file for complete search history.

(56) References Cited

U.S. PATENT DOCUMENTS

| | | | | |
|---|---|---|---|---|
| 2007/0216616 | A1 | 9/2007 | Stessen et al. | |
| 2010/0110112 | A1* | 5/2010 | Nakanishi | G09G 3/3426 345/690 |
| 2010/0245397 | A1 | 9/2010 | Choe et al. | |
| 2011/0169873 | A1* | 7/2011 | Sano | G09G 3/3611 345/102 |
| 2011/0298839 | A1* | 12/2011 | Nakanishi | G09G 3/3426 345/690 |

(Continued)

*Primary Examiner* — Ibrahim A Khan
(74) *Attorney, Agent, or Firm* — Quarles & Brady LLP

(57) ABSTRACT

In some examples, an electronic device includes sets of light-emitting diodes (LEDs) arranged into zones, multiple driver circuitries, a driver circuit of the multiple driver circuitries coupled to a set of LEDs of the sets of LEDs, and a comparison circuit coupled to the multiple driver circuitries. The comparison circuit compares a first luminance value of a first set of LEDs of a first zone and a second luminance value of a second set of LEDs of a second zone, and, in response to the comparison indicating that the first luminance value is greater than the second luminance value by a threshold difference, cause a first driver circuit to provide the first set of LEDs a first non-zero power level and a second driver circuit to provide the second set of LEDs a second power level, the second power level a non-zero multiplier of the first non-zero power level.

20 Claims, 5 Drawing Sheets

(56) References Cited

U.S. PATENT DOCUMENTS

| | | | | |
|---|---|---|---|---|
| 2012/0169792 | A1* | 7/2012 | Yamashita | G02F 1/1336 345/690 |
| 2012/0268350 | A1* | 10/2012 | Yoshimura | G09G 3/3426 345/1.3 |
| 2012/0268505 | A1* | 10/2012 | Tani | G09G 5/10 345/694 |
| 2014/0085360 | A1* | 3/2014 | Ohno | G09G 3/36 345/694 |
| 2015/0356905 | A1* | 12/2015 | Watanabe | G09G 3/3648 345/88 |
| 2020/0202798 | A1* | 6/2020 | Kimbrell | G09G 3/3607 |
| 2022/0005420 | A1* | 1/2022 | Sako | G09G 3/3426 |
| 2022/0055420 | A1 | 2/2022 | Bill | |
| 2023/0094077 | A1* | 3/2023 | Zhao | G09G 3/342 345/55 |
| 2023/0274710 | A1* | 8/2023 | Chen | G09G 3/32 345/690 |
| 2024/0233660 | A1* | 7/2024 | Kanbara | G02F 1/133603 |

* cited by examiner

POWER LEVELS OF LIGHT-EMITTING DIODES DRIVERS

BACKGROUND

Electronic devices such as televisions, desktops, laptops, notebooks, tablets, and smartphones are equipped with display panels for displaying images. Some types of display panels have light-emitting diode (LED) backlights. To enhance a quality of a displayed image, some types of display panels group the LEDs into individually adjustable zones.

BRIEF DESCRIPTION OF THE DRAWINGS

Various examples are described below referring to the following figures.

DETAILED DESCRIPTION

Figure 1:
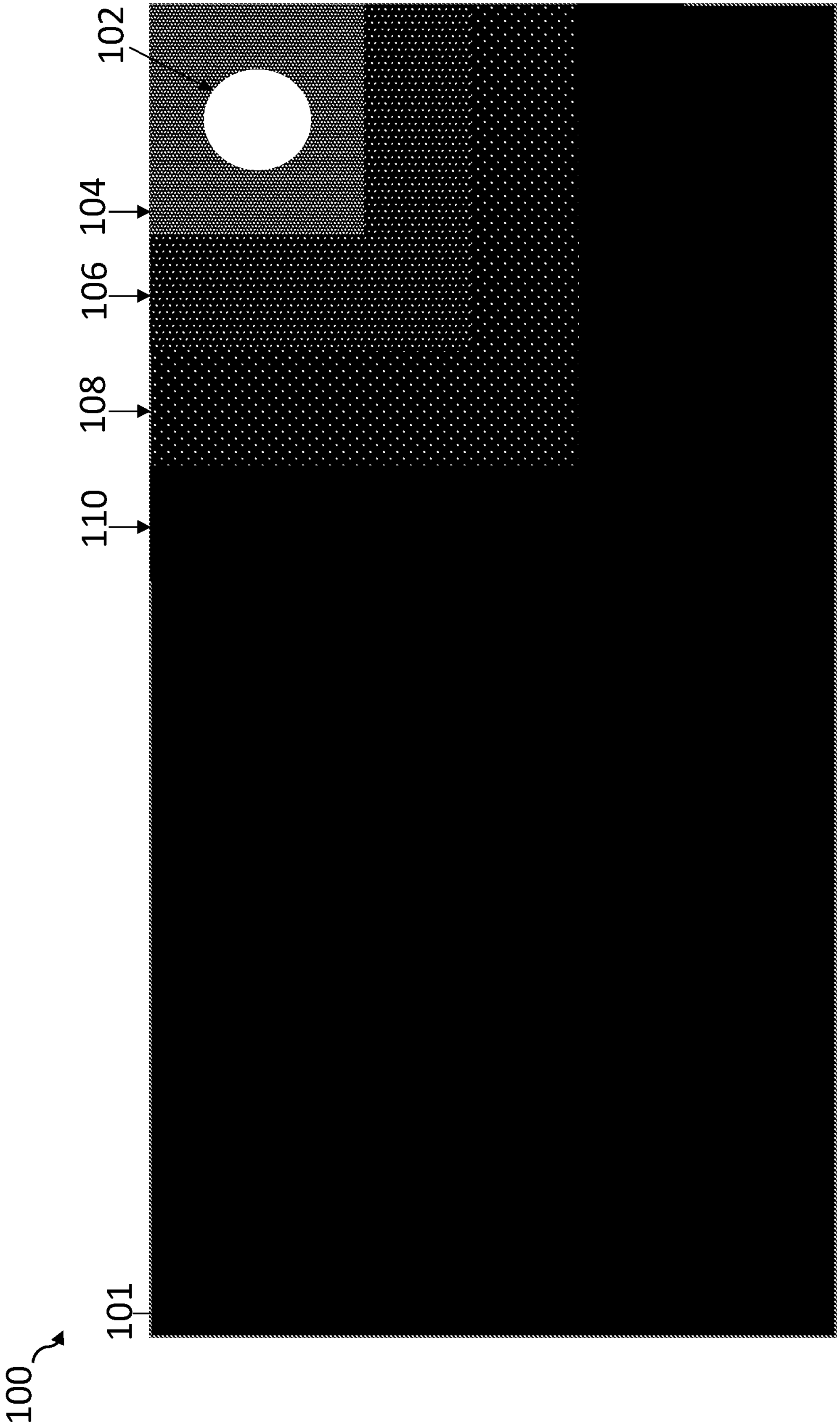
FIG. 1 is a block diagram of an electronic device for modifying power levels of drivers for LEDs, in accordance with various examples.

As described above, to enhance a quality of a displayed image, a display panel of an electronic device groups LEDs into individually adjustable zones. Local dimming, as used herein, refers to dimming an amount of emitted light of LEDs in some zones while keeping an amount of emitted light of LEDs of other zones unmodified. However, in instances in which the image includes an area having a higher luminance value than luminance values of surrounding areas, light from a zone including pixels having the higher luminance values bleeds into zones including the surrounding areas having lower luminance values. A halo effect, or blooming, as used herein, refers to light from a zone having the higher luminance values bleeding into another zone that has the lower luminance values. While some display panels enable a user to adjust a setting that reduces a dimming of the backlights to reduce the halo effect, reducing the dimming also reduces contrast ratios. Reduced contrast ratios reduce the image quality of an image displayed.

This description describes a comparison circuit to modify power levels of zones to reduce halo effects. The power level enables LEDs in a zone to emit light. Driving the LEDs in the zone, as used herein, refers to providing the power level to enable the LEDs in the zone to emit light. In some examples, the power level causes a liquid crystal to enable the light to transmit through a glass panel of the display panel. The comparison circuit determines differences between luminance values of pixels of different zones. In response to a difference being equivalent to or greater than a threshold difference, the comparison circuit drives the LEDs of the contiguous zones with different non-zero power levels. In some examples, the comparison circuit causes a first driver circuit coupled to LEDs of a first zone to provide a first non-zero power level and a second driver circuit coupled to LEDs of a second zone to provide a second power level. In various examples, the second zone is contiguous to the first zone. In some examples, the second power level is a non-zero multiplier of the first power level.

Utilizing the comparison circuit that modifies the power levels of different zones reduces the halo effect without modifying the contrast ratio. Reducing the halo effect enhances the image quality.

In some examples in accordance with the present description, an electronic device is provided. The electronic device includes sets of light-emitting diodes (LEDs) arranged into zones, multiple driver circuitries, where a driver circuit of the multiple driver circuitries is coupled to a set of LEDs of the sets of LEDs, and a comparison circuit coupled to the multiple driver circuitries. The comparison circuit compares a first luminance value of a first set of LEDs of a first zone and a second luminance value of a second set of LEDs of a second zone, where the first zone and the second zone are contiguous. In response to the comparison indicating that the first luminance value is greater than the second luminance value by a threshold difference, the comparison circuit causes a first driver circuit to provide the first set of LEDs a first non-zero power level and a second driver circuit to provide the second set of LEDs a second power level, where the second power level is a non-zero multiplier of the first non-zero power level.

In some examples in accordance with the present description, a method is provided. The method includes determining differences between luminance values of LEDs in contiguous zones, determining whether a first difference of the differences is equivalent to or greater than a threshold difference, where the first difference is between a first zone and a second zone of the multiple contiguous zones, and, in response to the first difference being equivalent to or greater than the threshold difference, providing by a first driver circuit a first non-zero power level to drive LEDs in the first zone and providing by a second driver circuit a second non-zero power level to drive LEDs in the second zone, where the second non-zero power level is different than the first non-zero power level.

In some examples in accordance with the present description, a non-transitory machine-readable medium storing machine-readable instructions is provided. The term “non-transitory,” as used herein, does not encompass transitory propagating signals. The machine-readable instructions, when executed by a controller of an electronic device, cause the controller to determine a difference between a first luminance value of LEDs in a first zone and a second luminance value of LEDs in a second zone, and, in response to the difference being equivalent to or greater than a threshold difference, cause a first driver circuit to provide a first non-zero power level to drive the LEDs in the first zone and a second driver circuit to provide a second power level to drive the LEDs in the second zone. The second power level is a non-zero multiplier of the first non-zero power level.

Referring now to FIG. 1, a block diagram of an electronic device 100 for modifying power levels of drivers for LEDs is shown, in accordance with various examples. The electronic device 100 is a television, a desktop, a laptop, a notebook, a tablet, a smartphone, or other computing device equipped with a display panel 101, for example. The display panel 101 is a liquid crystal display (LCD) panel with an LED backlight (not explicitly shown), for example. The display panel 101 includes a mini-light-emitting diode (mini-LED) backlight, a micro-LED backlight, or other LED backlight having adjustable zones to emit light to display an image to the display panel 101. The image includes zones 102, 104, 106, 108, 110 displaying different portions of the image having different luminance values. In various examples, the zones 102, 104, 106, 108, 110 include multiple zones that are contiguous zones associated with a luminance value. For example, the zone 102 includes four zones of LEDs. The zone 104 includes multiple zones of LEDs that are contiguous to the four zones of LEDs of zone 104. In some examples, the zone 104 is referred to as framing the zone 102. The zone 106, 108, 110 includes multiple zones of LEDs that are contiguous with the multiple zones of LEDs of zone 104, 106, 108, respectively.

In some examples, the display panel 101 is an integrated display panel of the electronic device 100. The electronic device 100 is a micro-LED television, a mini-LED monitor of a laptop, or a smartphone having a micro-LED touchscreen, for example. In other examples, the display panel 101 is communicatively coupled to the electronic device 100 via a wired connection (e.g., Universal Serial Bus (USB), High-Definition Multimedia Interface (HDMI), Video Graphics Array (VGA), Digital Visual Interface (DVI), DisplayPort (DP), or other suitable standard or specification for communicating with display panels), or a wireless connection (e.g., WI-FI, BLUETOOTH).

While not explicitly shown, in various examples, the display panel 101 includes a light guide plate. In some examples, the LCD may be an organic LCD (OLCD). In various examples, the LEDs of the backlight are arranged into zones that are perpendicular to an image scan direction. For example, during manufacture, the LEDs are placed in rows and columns. A number of LEDs within a row, within a column, or some combination thereof, are coupled to a driver. In this manner, the LEDs are said to be “arranged” into zones. The image scan direction follows a gate line refresh sequence of the LCD. A gate line enables a line of pixels of the display panel 101 to selectively turn on or off. A pixel, as used herein, includes a liquid crystal, a filter, or a combination thereof, and displays a portion of an image. When a gate line turns on, the image displayed by the pixels of the gate line may be refreshed. The gate line refresh sequence is the order in which liquid crystals of the LCD are driven. The gate line refresh sequence may be vertical, flowing from the top to the bottom or from the bottom to the top of the display panel 101, or horizontal, flowing from the left to the right or from the right to the left of the display panel 101. In response to a vertical gate line refresh sequence, the LEDs are arranged into horizontal zones, for example. In another example, in response to a horizontal gate line refresh sequence, the LEDs are arranged into vertical zones. In some examples, the gate line refresh sequence may first flow horizontally across multiple rows of liquid crystals of the LCD and then flow vertically to a next set of multiple rows of liquid crystals of the LCD.

As described above, the electronic device 100 adjusts a power level of individual zones of LEDs of the display panel 101 to reduce the halo effect. In some examples, the display panel 101 receives an image from the electronic device 100. A comparison circuit of the display panel 101 determines differences between luminance values of LEDs of different zones. In various examples, the comparison circuit subtracts a voltage or current supplied to LEDs of a first zone from a voltage or current supplied to LEDs of a second zone to determine the difference. A higher voltage or current supplied to LEDs of a zone indicates a higher luminance value for the zone while a lower voltage or current supplied to LEDs of the zone indicates a lower luminance value. In some examples, the comparison circuit determines an average luminance value of pixels of a zone to determine a luminance value of LEDs of the zone. The comparison circuit determines the average luminance value of pixels of the zone by summing luminance values of the pixels of the zone and dividing the summation by a total number of the pixels in the zone, for example. In other examples, the comparison circuit determines a specified number of luminance values of pixels of a zone are equivalent to or greater than a brightness threshold. The specified number of pixels is dependent upon a number of pixels of a zone. For example, in response to the zone having 1000 pixels, the specified number is a percentage of 1000 pixels. The percentage is 25%, 33%, 50%, or another suitable value.

In response to the determination that the specified number of luminance values of the pixels of the zone are equivalent to or greater than the brightness threshold, the comparison circuit uses the brightness threshold as a luminance value for the zone. In some examples, the comparison circuit determines a specified number of luminance values of pixels of a zone are equivalent to or less than a dimness threshold. In response to the determination that the specified number of luminance values of the pixels of the zone are equivalent to or less than the dimness threshold, the comparison circuit uses the dimness threshold as a luminance value for the zone.

The comparison circuit determines differences between the luminance values of the different zones. In response to a difference of contiguous zones being equivalent to or greater than a threshold difference, the comparison circuit drives the LEDs of the contiguous zones with different non-zero power levels. For example, the comparison circuit determines that a difference between a luminance value of a zone 102 and a luminance value of a zone 104 is equivalent to or greater than the threshold difference. In response to the determination, the comparison circuit causes a first driver circuit coupled to LEDs of the zone 102 to provide a first non-zero power level and a second driver circuit coupled to LEDs of the zone 104 to provide a second power level. For example, the first non-zero power level is a specified power level used to drive the zone 102 at a first rate. The first rate is determined by a refresh rate, as described below with respect to FIG. 2, for example. In various examples, the zone 104 is contiguous to the zone 102. In some examples, the second power level is a non-zero multiplier of the first power level. For example, the non-zero multiplier of the first power level is greater than one. The non-zero multiplier that is greater than one drives the LEDs of the zone 104 at a second rate that is faster than the first rate. By modifying a power level of the zone 104 so that pixels of the zone 104 have a faster rate than pixels of the zone 102, the pixels of the zone 104 reach a dimmer state prior to pixels of the zone 102 reaching a brighter state, thereby decreasing an amount of the halo effect in the zone 104.

In some examples, the comparison circuit determines that a difference between a luminance value of a zone 102 and a luminance value of a zone 106 is equivalent to or greater than the threshold difference, the comparison circuit causes a third driver circuit coupled to LEDs of the zone 106 to provide a third power level. In various examples, the zone 106 is contiguous to the zone 104 that is contiguous to the zone 102, where the zone 104 has a modified power level. In some examples, the third power level is a second non-zero multiplier of the first power level. For example, the second non-zero multiplier of the first power level is greater than one. In another example, the second non-zero multiplier is greater than a non-zero multiplier associated with the zone 104. The second non-zero multiplier that is greater than one drives the LEDs of the zone 106 at a third rate that is faster than the first rate. In some examples, the third rate is faster than a rate associated with the zone 104. By modifying a power level of the zone 106 so that pixels of the zone 106 have a faster rate than pixels of the zone 102, the pixels of the zone 106 reach a dimmer state prior to pixels of the zone 102 reaching a brighter state, thereby decreasing an amount of the halo effect in the zone 106. By modifying a power level of the zone 106 so that pixels of the zone 106 have a faster rate than pixels of the zone 104, the pixels of the zone 106 reach a dimmer state prior to pixels of the zone 104 reaching the dimmer state, thereby decreasing an amount of the halo effect in the zone 104.

In other examples, the comparison circuit determines that a difference between a luminance value of a zone 102 and a luminance value of a zone 108 is equivalent to or greater than the threshold difference, the comparison circuit causes a fourth driver circuit coupled to LEDs of the zone 108 to provide a fourth power level. In various examples, the zone 108 is contiguous to the zone 106 that is contiguous to the zone 104, which is contiguous to the zone 102. The zones 104, 106 have modified power levels. In some examples, the fourth power level is a third non-zero multiplier of the first power level. For example, the third non-zero multiplier of the first power level is greater than one. In another example, the third non-zero multiplier is greater than non-zero multipliers associated with the zones 104, 106. The third non-zero multiplier that is greater than one drives the LEDs of the zone 108 at a fourth rate that is faster than the first rate. In some examples, the fourth rate is faster than rates associated with the zones 104, 106. By modifying a power level of the zone 108 so that pixels of the zone 108 have a faster rate than pixels of the zone 102, the pixels of the zone 108 reach a dimmer state prior to pixels of the zone 102 reaching a brighter state, thereby decreasing an amount of the halo effect in the zone 108. By modifying a power level of the zone 108 so that pixels of the zone 108 have a faster rate than pixels of the zones 104, 106, the pixels of the zone 108 reach a dimmer state prior to pixels of the zones 104, 106 reaching the dimmer state, thereby decreasing an amount of the halo effect in the zone 108.

In various examples, the comparison circuit determines that a difference between a luminance value of a zone 102 and a luminance value of a zone 110 is equivalent to or greater than the threshold difference and that differences between the luminance values of intermediary zones (e.g., the zones 104, 106, 108) and the zone 102 are equivalent to or greater than the threshold difference. In response to the determination that the differences associated with the intermediary zones are equivalent to or greater than the threshold difference, the comparison circuit causes a fifth driver circuit coupled to LEDs of the zone 110 to provide a fifth power level. In various examples, the zone 110 is contiguous to the zone 108 that is contiguous to the zone 106, which is contiguous to the zone 104, which is contiguous to the zone 102. The zones 104, 106, 108 have modified power levels. In some examples, the fifth power level is a fourth non-zero multiplier of the first power level. For example, the fourth non-zero multiplier of the first power level is greater than one. In another example, the fourth non-zero multiplier is greater than non-zero multipliers associated with the zones 104, 106, 108. The fourth non-zero multiplier that is greater than one drives the LEDs of the zone 110 at a fifth rate that is faster than the first rate. In some examples, the fifth rate is faster than rates associated with the zones 104, 106, 108. The fifth rate decreases an amount of the halo effect in the zone 110. By modifying a power level of the zone 110 so that pixels of the zone 110 have a faster rate than pixels of the zone 102, the pixels of the zone 110 reach a dimmer state prior to pixels of the zone 102 reaching a brighter state, thereby decreasing an amount of the halo effect in the zone 110. By modifying a power level of the zone 110 so that pixels of the zone 110 have a faster rate than pixels of the zones 104, 106, 108, the pixels of the zone 110 reach a dimmer state prior to pixels of the zones 104, 106, 108 reaching the dimmer state, thereby decreasing an amount of the halo effect in the zone 110.

In some examples, the comparison circuit determines differences between luminance values of a number of zones contiguous to a zone having a luminance value that is equivalent to or greater than the brightness threshold. The comparison circuit determines the differences are equivalent to or greater than the threshold difference. In response to the determination that the differences are equivalent to or greater than the threshold difference, the comparison circuit modifies power levels of a subset of the number of zones. For example, the comparison circuit determines that the differences between luminance values of the zones 104, 106, 108, 110 and the zone 102 are equivalent to or greater than the threshold difference. In response to the determination that the differences between the luminance values of the zones 104, 106, 108, 110 are equivalent to or greater than the threshold difference, the comparison circuit modifies the power levels of the zones 104, 106. The subset of the number of zones is determined by a linear function, an exponential growth function, or an exponential decay function, for example.

In various examples, the comparison circuit causes the first driver circuit coupled to the LEDs of the zone 102 to provide a first power level, the second driver circuit coupled to the LEDs of the zone 104 to provide a second power level, and the third driver circuit coupled to the LEDs of the zone 106 to provide a third power level. In some examples, the second power level and the third power level are a non-zero multiplier of the first power level. In other examples, the second power level is a first non-zero multiplier of the first power level and the third power level is a second non-zero multiplier of the first power level. In some examples, the first and the second non-zero multipliers are determined by a slope of a linear function. In other examples, the first and the second non-zero multipliers are determined by an exponential function. In various examples, the subset of the number of zones is a specified number of zones. In some examples, the specified number of zones is based on a number of zones having the luminance values that are equivalent to or greater than the brightness threshold. For example, the specified number of zones is a multiplier of the number of zones having the luminance values that are equivalent to or greater than the brightness threshold. In other examples, the specified number of zones is determined at a time of manufacture.

In various examples, the specified number of pixels of a zone, the brightness threshold, the dimness threshold, the difference threshold, the specified number of zones, the linear function, the exponential growth function, the exponential decay function, the multipliers, the rates, or a combination thereof, are determined at a time of manufacture. In other examples, a user uses a graphical user interface (GUI) to determine the specified number of pixels of the zone, the brightness threshold, the dimness threshold, the difference threshold, the specified number of zones, the linear function, the exponential growth function, the exponential decay function, the multipliers, the rates, or the combination thereof.

Figure 2:
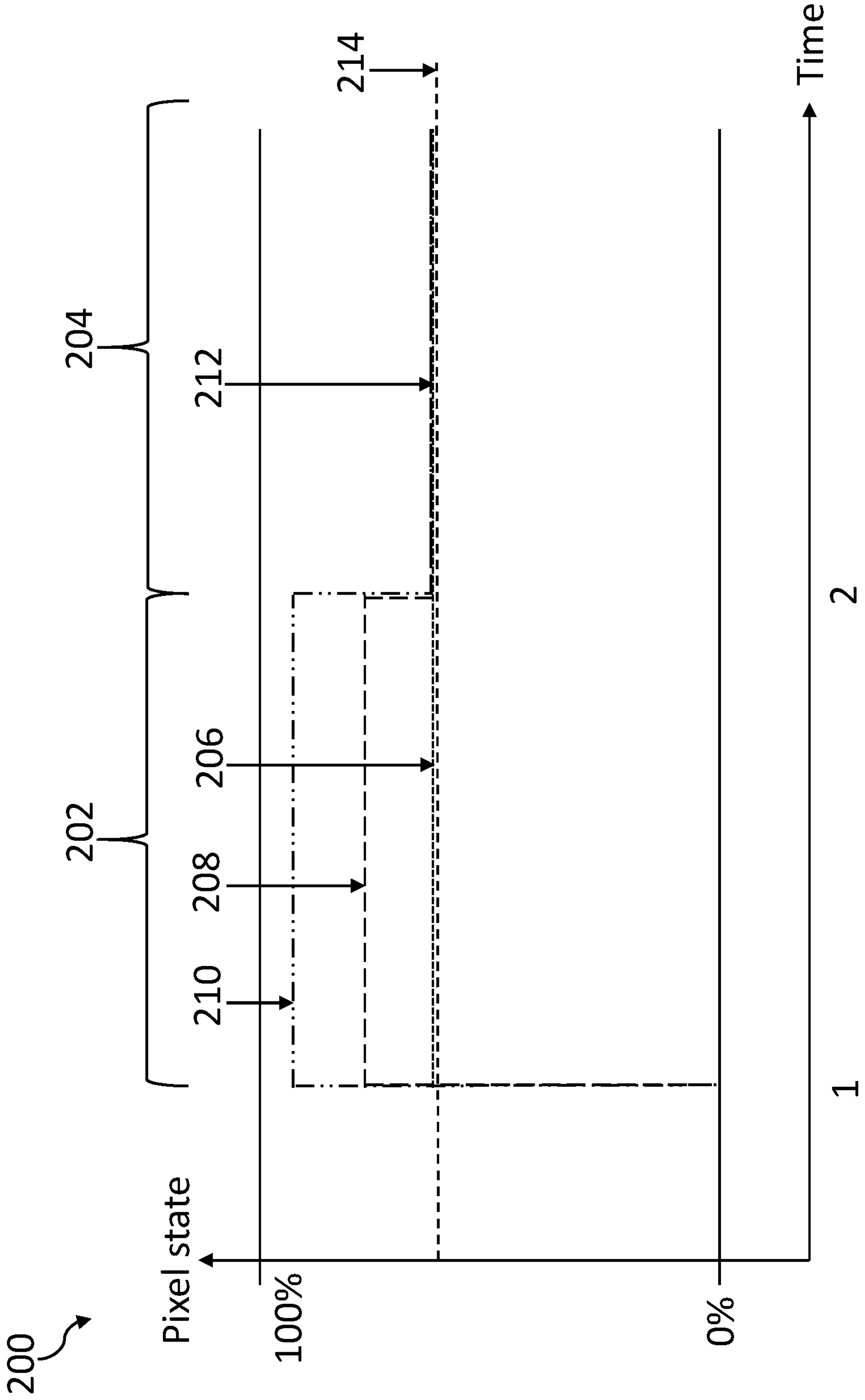
FIG. 2 is a timing diagram of an electronic device modifying power levels of drivers for LEDs, in accordance with various examples.

Referring now to FIG. 2, a timing diagram 200 of an electronic device (e.g., the electronic device 100) modifying power levels of drivers for LEDs is shown, in accordance with various examples. The timing diagram 200 shows "Time" along an x-axis and "Pixel state" along a y-axis. The Time indicates a time period. For example, a first time period begins at 1 and a second time period begins at 2. The Pixel state indicates an amount of light emitted by a pixel, for example. The amount of light emitted is modified by a power level supplied to the pixel, for example. The timing diagram 200 shows time periods 202, 204. During a time period 202, the electronic device provides power levels 206, 208, 210. During a time period 204, the electronic device provides a power level 212. The time period 202 is a first time period during which drivers provide the power levels 206, 208, 210 to different zones. The time period 204 is a second time period during which the drivers provide the power level 212 to the different zones. A power level 214 indicates a power level that enables the pixels to display a portion of an image. The power level 214 is referred to as a target power level in various examples.

In various examples, a duration of the time periods 202, 204 is equivalent to an inverse of an image refresh rate. The image refresh rate of a display panel is the number of times an image refreshes, or is redrawn, per second. The image refresh rate may be a setting of the electronic device determined by a user or set during manufacture, for example. For example, in response to the image refresh rate for time periods 202, 204 being equivalent to 60 Hz, a duration of the time periods 202, 204 equals 1/60 seconds, or 16.67 milliseconds (ms). In another example, in response to the image refresh rate for time periods 202, 204 being equivalent to 144 Hz, a duration of the time periods 202, 204 equals 1/144 seconds, or 6.94 ms. In another example, the image refresh rate for the time period 202 is a first rate and the image refresh rate for the time period 204 is a second rate. For example, the image refresh rate for the time period 202 is 60 KHz and the duration of the time period 202 is 16.67 ms, and the image refresh rate for the time period 204 is 144 kHz and the duration of the time period 204 is 6.94 ms.

As described above with respect to FIG. 1, a comparison circuit of the electronic device determines that a first difference between a first luminance value of a first zone and a second luminance value of a second zone is equivalent to or greater than the threshold difference. In response to the determination, the comparison circuit causes a first driver circuit coupled to LEDs of the first zone to provide a power level 206 and a second driver circuit coupled to LEDs of the second zone to provide a power level 208. The power level 206 is a non-zero power level, and the power level 208 is a first non-zero multiplier of the power level 206. The non-zero multiplier is greater than one, for example. The comparison circuit determines that a second difference between the first luminance value of the first zone and a third luminance value of a third zone is equivalent to or greater than the threshold difference. In response to the determination, the comparison circuit causes a third driver circuit coupled to LEDs of the third zone to provide a power level 210. The power level 210 is a second non-zero multiplier of the power level 206. The second non-zero multiplier is greater than one, for example. The second non-zero multiplier is greater than the first non-zero multiplier, in various examples.

In some examples, the comparison circuit determines that the second difference is equivalent to or greater than the threshold difference and that a third difference between the second luminance value and the third luminance value is less than the threshold difference. In response to the determination, the comparison circuit causes the third driver circuit coupled to LEDs of the third zone to provide the power level 210.

In other examples, the comparison circuit determines that the first difference between the first luminance value of the first zone and the second luminance value of the second zone is equivalent to or greater than a first threshold difference. In response to the determination, the comparison circuit causes the first driver circuit coupled to LEDs of the first zone to provide the power level 206 and the second driver circuit coupled to LEDs of the second zone to provide the power level 208. The power level 206 is a non-zero power level, and the power level 208 is a non-zero multiplier of the power level 206. The non-zero multiplier is greater than 1.25, for example. The comparison circuit determines that a second difference between the second luminance value and the third luminance value is equivalent to or greater than a second threshold difference. In some examples, the second threshold difference is less than the first threshold difference. In response to the determination, the comparison circuit causes the third driver circuit coupled to LEDs of the third zone to provide the power level 210. The power level 210 is a non-zero multiplier of the power level 208, for example. In some examples, the non-zero multiplier of the power level 208 is greater than the non-zero multiplier of the power level 206. The non-zero multiplier of the power level 208 is 1.5, and the non-zero multiplier of the power level 206 is 1.25, for example. The non-zero multipliers of the power levels 206, 208 are based on an exponential growth function, for example. In other examples, the non-zero multiplier of the power level 206 is less than the non-zero multiplier of the power level 208. The non-zero multiplier of the power level 206 is 1.25, and the non-zero multiplier of the power level 208 is 1.5, for example. The non-zero multipliers of the power levels 206, 208 are based on an exponential decay function, for example.

In various examples, the target power level, the image refresh rate, the threshold differences, or a combination thereof, are determined at a time of manufacture. In other examples, the user uses the GUI to determine the target power level, the image refresh rate, the threshold differences, or the combination thereof. In some examples, an application is implemented by machine-readable instructions, which, when executed by a controller, cause the controller to perform specified tasks of the application determines the image refresh rate. For example, the application is a video streaming application or a gaming application and the image refresh rate is determined by refresh rates of a video signal displayed by the application.

Figure 3:
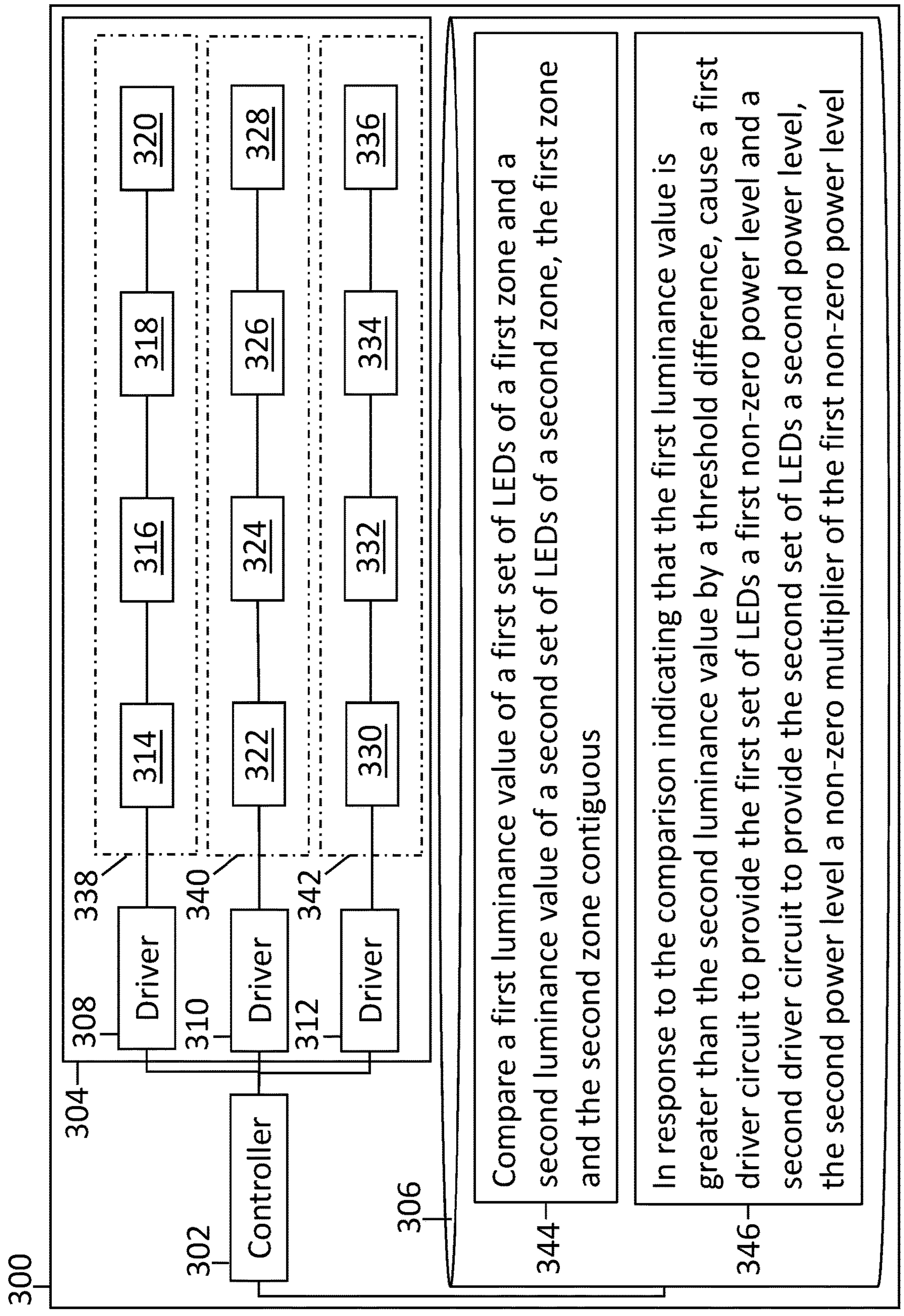
FIG. 3 is a block diagram of an electronic device for modifying power levels of drivers for LEDs, in accordance with various examples.

Referring now to FIG. 3, a block diagram of an electronic device 300 for modifying power levels of drivers 308, 310, 312 for LEDs 314, 316, 318, 320, 322, 324, 328, 330, 332, 334, 336 is shown, in accordance with various examples. The electronic device 300 is the electronic device 100, for example. The electronic device 300 includes a controller 302, a display panel 304, and a storage device 306. The controller 302 is a microcontroller, a microcomputer, a programmable integrated circuit, a programmable gate array, or other suitable device for managing operations of the electronic device 300 or a component or multiple components of the electronic device 300. For example, the controller 302 is a central processing unit (CPU), a graphics processing unit (GPU), or an embedded security controller (EpSC). In another example, the controller 302 is a timing controller. The display panel 304 includes drivers 308, 310, 312 and LEDs 314, 316, 318, 320, 322, 324, 326, 328, 330, 332, 334, 336, which are referred to as the LEDs 314-336 collectively. The display panel 304 is the display panel 101, for example. The drivers 308, 310, 312 are electronic circuits or components that provide the power level to zones 338, 340, 342. A zone 338 includes the LEDs 314, 316, 318, 320. A zone 340 includes the LEDs 322, 324, 326, 328. A zone 342 includes the LEDs 330, 332, 334, 336. The drivers 308, 310, 312 are transistors or integrated circuits comprising multiple transistors, for example. The storage device 306 is a hard drive, a solid-state drive (SSD), flash memory, random access memory (RAM), or other suitable memory for storing data or machine-readable instructions of the electronic device 300.

While not explicitly shown, in various examples, the display panel 304 includes a light guide plate. In some examples, the LCD may be an organic LCD (OLCD). In various examples, the LEDs 314-336 are arranged into zones 338, 340, 342 relevant to an image scan direction. For example, during manufacture, the LEDs 314-336 are placed in rows and columns. A number of LEDs within a row, within a column, or some combination thereof, are coupled to a driver 308, 310, 312. In this manner, the LEDs 314-336 are said to be "arranged" into zones. The image scan direction follows a gate line refresh sequence of the LCD. A gate line enables a line of pixels of the display panel 304 to selectively turn on or off. When a gate line turns on, the image displayed by the pixels of the gate line may be refreshed. The gate line refresh sequence is the order in which liquid crystals of the LCD are driven. The gate line refresh sequence may be vertical, flowing from the top to the bottom or from the bottom to the top of the display panel 304, or horizontal, flowing from the left to the right or from the right to the left of the display panel 304. In response to a vertical gate line refresh sequence, the LEDs 314-336 are arranged into zones 338, 340, 342, which are horizontal, for example. In another example, in response to a horizontal gate line refresh sequence, the LEDs 314-336 are arranged into vertical zones. In some examples, the gate line refresh sequence may first flow horizontally across multiple rows of liquid crystals of the LCD and then flow vertically to a next set of multiple rows of liquid crystals of the LCD.

While in various examples, the drivers 308, 310, 312 are located within the display panel 304, in other examples, the drivers 308, 310, 312 are located outside of the display panel 304 but within the electronic device 300. While not explicitly shown, a power supply is coupled to the driver in some examples. The power supply is to supply the power level. The power supply is a voltage supply or a current supply, for example. In some examples, a multiplexer is coupled between the driver and the power level and an output of a comparison circuit is an input to the multiplexer. The output of the comparison circuit selects which power level of a specified number of power levels is provided to the driver via the multiplexer, for example. The specified number of power levels is determined by a specified number of zones, for example. The specified number of zones is determined using the techniques described above with respect to FIG. 2, for example. In some examples, a first power level of the specified number of power levels is a power level used to enable a pixel state within a time period (e.g., the time period 202, 204) associated with an image refresh rate and other power levels of the specified number of power levels are multipliers of the first power level.

While not explicitly shown, in some examples, the electronic device 300 includes network interfaces, video adapters, sound cards, local buses, peripheral devices (e.g., a keyboard, a mouse, a touchpad, a speaker, a microphone), or a combination thereof. In various examples, the controller 302 is coupled to the display panel 304 and the storage device 306. In some examples, the controller 302 is coupled to the LEDs 314-336 via the drivers 308, 310, 312.

In various examples, the storage device 306 stores machine-readable instructions 344, 346, which, when executed by the controller 302, cause the controller 302 to perform some or all of the actions attributed herein to the controller 302. The machine-readable instructions 344, 346, when executed by the controller 302, cause the controller 302 to modify power levels of the drivers 308, 310, 312 for the LEDs 314, 316, 318, 320, 322, 324, 326, 328, 330, 332, 334, 336. The machine-readable instruction 344, when executed by the controller 302, causes the controller 302 to compare a first luminance value of a first set of LEDs of a first zone and a second luminance value of a second set of LEDs of a second zone. The first zone and the second zone are contiguous. In response to the comparison indicating that the first luminance value is greater than the second luminance value by a threshold difference, the machine-readable instruction 346, when executed by the controller 302, causes a first driver circuit to provide the first set of LEDs a first non-zero power level and a second driver circuit to provide the second set of LEDs a second power level. The second power level is a non-zero multiplier of the first non-zero power level.

In some examples, the controller 302 compares a luminance value of the LEDs 314, 316, 318, 320 of the zone 338 and a luminance value of the LEDs 322, 324, 326, 328 of the zone 340. The controller 302 determines the luminance values using the techniques described above with respect to FIG. 1, for example. In response to the comparison indicating that the luminance value of the LEDs 314, 316, 318, 320 is greater than the luminance value of the LEDs 322, 324, 326, 328 by the threshold difference, the controller 302, causes the driver 308 to provide the LEDs 314, 316, 318, 320 a first non-zero power level (e.g., the power level 206) and the driver 310 to provide the LEDs 322, 324, 326, 328 a second power level (e.g., the power level 208).

In various examples, the electronic device 300 includes sets of LEDs 314-320, 322-328, 330-336 arranged into zones 338, 340, 342, respectively, multiple driver circuitries (e.g., the drivers 308, 310, 312), where a driver circuit of the multiple driver circuitries is coupled to a set of LEDs of the sets of LEDs, and a comparison circuit coupled to the multiple driver circuitries. In some examples, the controller 302 and the storage device 306 storing the machine-readable instructions are referred to as the comparison circuit. The comparison circuit compares a first luminance value of a first set of LEDs of a first zone and a second luminance value of a second set of LEDs of a second zone, where the first zone and the second zone are contiguous. In response to the comparison indicating that the first luminance value is greater than the second luminance value by a threshold difference, the comparison circuit causes a first driver circuit to provide the first set of LEDs a first non-zero power level and a second driver circuit to provide the second set of LEDs a second power level. The second power level is a non-zero multiplier of the first non-zero power level.

In some examples, the comparison circuit includes the controller 302 and the storage device 306 storing machine-readable instructions, which, when executed by the controller 302, cause the controller 302 to compare a third luminance value of a third set of LEDs of a third zone and the second luminance value of the second set of LEDs of the second zone. The second zone and the third zone are contiguous. In response to the comparison indicating that the second luminance value is greater than the third luminance value by the threshold difference, the machine-readable instructions, when executed by the controller 302, cause the controller 302 to cause a third driver circuit to provide the third set of LEDs a third power level, the third power level a non-zero multiplier of the second power level.

While in the examples shown, the controller 302 executes the machine-readable instructions 344, 346 to modify power levels of the drivers 308, 310, 312, in other examples, the comparison circuit includes comparators coupled to the controller 302, the drivers 308, 310, 312, multiplexers, switches, or a combination thereof to perform some or all of the steps of the machine-readable instructions. For example, a comparator compares the first luminance value of the first set of LEDs (e.g., the LEDs 314-320) of the first zone (e.g., the zone 338) and the second luminance value of the second set of LEDs (e.g., the LEDs 322-328) of the second zone (e.g., the zone 340). In response to the comparison indicating that the first luminance value is greater than the second luminance value by the threshold difference, an output of the comparator causes the first driver circuit (e.g., the driver 308) to provide the first set of LEDs the first non-zero power level and the second driver circuit (e.g., the driver 310) to provide the second set of LEDs the second power level, where the second power level is a non-zero multiplier of the first power level.

Figure 4:
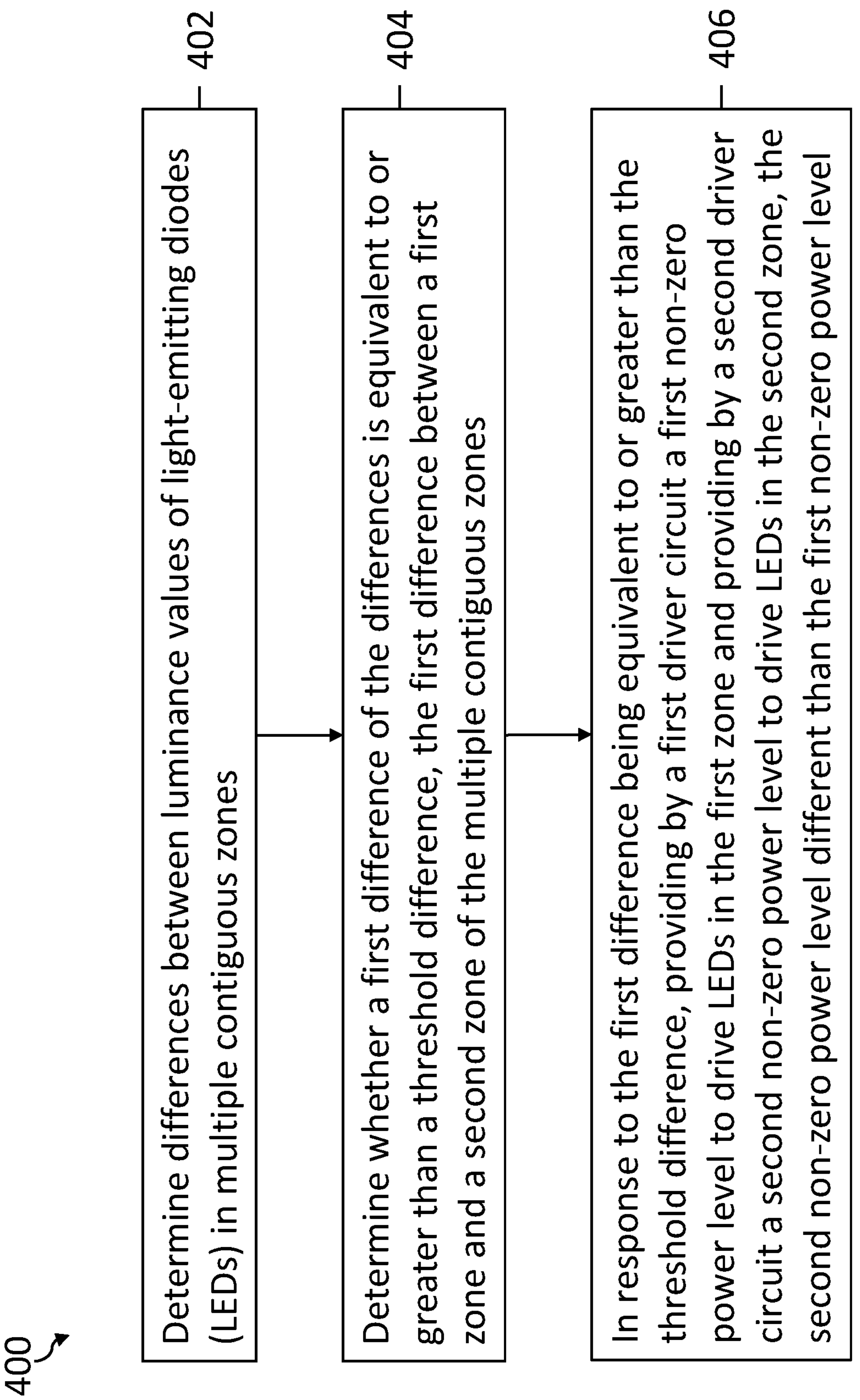
FIG. 4 is a flow diagram of a method for modifying power levels of drivers for LEDs, in accordance with various examples.

Referring now to FIG. 4, a flow diagram for a method 400 for modifying power levels of drivers (e.g., the drivers 308, 310, 312) for LEDs (e.g., the LEDs 314-336) is shown, in accordance with various examples. The method 400 includes determining differences between luminance values of LEDs in contiguous zones (402). The method 400 also includes determining whether a first difference of the differences is equivalent to or greater than a threshold difference, where the first difference is between a first zone and a second zone of the multiple contiguous zones (404). Additionally, in response to the first difference being equivalent to or greater than the threshold difference, the method 400 includes providing by a first driver circuit a first non-zero power level to drive LEDs in the first zone and providing by a second driver circuit a second non-zero power level to drive LEDs in the second zone, where the second non-zero power level is different than the first non-zero power level (406).

In various examples, in response to the first difference being less than the threshold difference, the method 400 also includes determining whether a second difference of the differences is equivalent to or greater than the threshold difference, where the second difference is between a third zone and a fourth zone of the multiple contiguous zones. In response to the second difference being equivalent to or greater than the threshold difference, the method 400 additionally includes providing by a third driver circuit the first non-zero power level to LEDs in the third zone and providing by a fourth driver circuit the second non-zero power level to drive LEDs in the fourth zone.

In some examples, in response to the second difference being less than the threshold difference, the method 400 also includes determining whether a third difference of the differences is equivalent to or greater than the threshold difference, where the third difference is between the first zone and the third zone of the multiple contiguous zones. Additionally, in response to the third difference being equivalent to or greater than the threshold difference, the method 400 includes providing by the third driver circuit the second non-zero power level to drive the LEDs in the third zone and providing by the first driver circuit the first non-zero power level to drive the LEDs in the first zone.

In various examples, the method 400 includes providing by the fourth driver circuit the second non-zero power level to drive the LEDs in the fourth zone. In other examples, the method 400 includes determining whether a fourth difference of the differences is equivalent to or greater than the threshold difference, where the fourth difference is between the first zone and the fourth zone of the multiple contiguous zones. In response to the fourth difference being less than the threshold difference, the method 400 includes providing by the fourth driver circuit a third non-zero power level to drive the LEDs in the fourth zone, where the third non-zero power level is between the first non-zero power level and the second non-zero power level.

Figure 5:
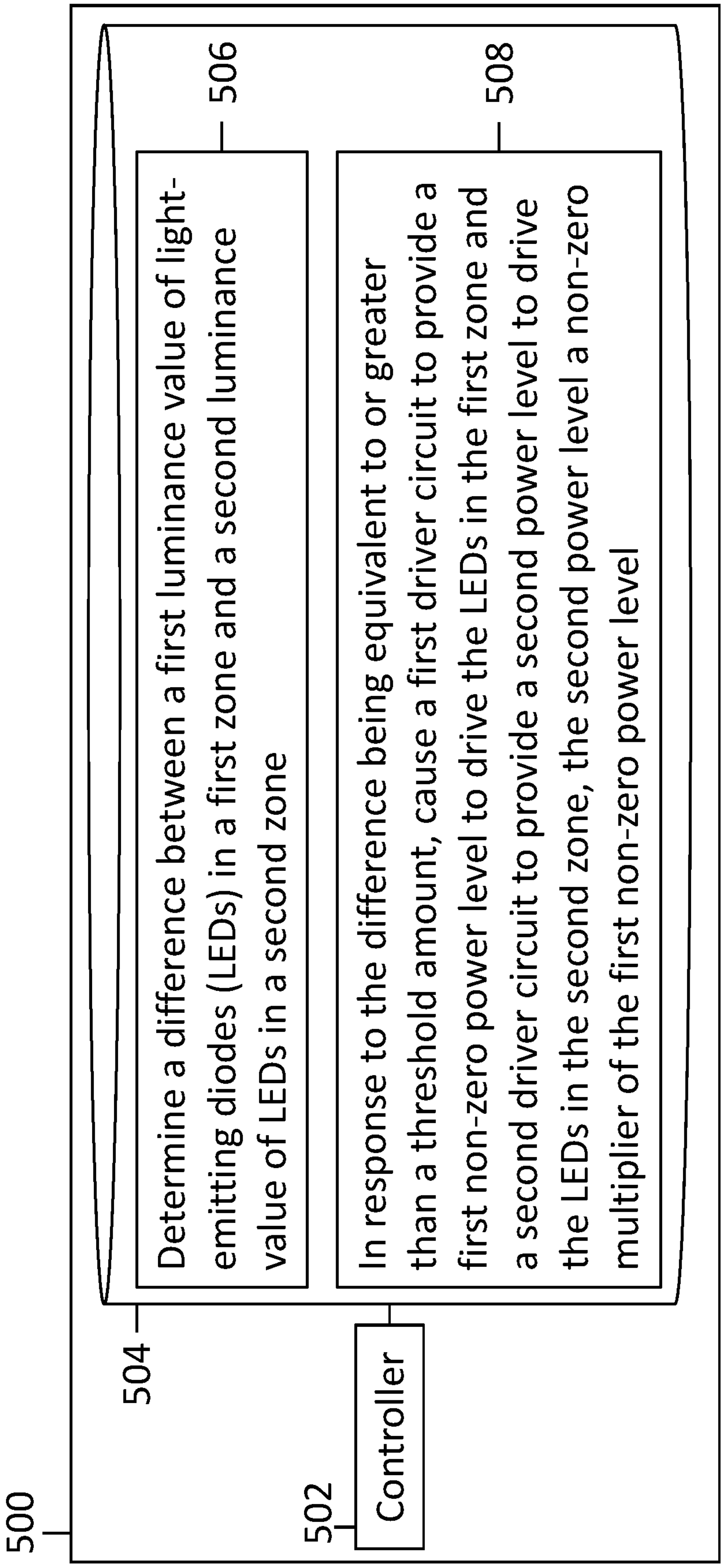
FIG. 5 is a block diagram of an electronic device for modifying power levels of drivers for LEDs, in accordance with various examples.

Referring now to FIG. 5, a block diagram of an electronic device 500 for modifying power levels of drivers for LEDs is shown, in accordance with various examples. The electronic device 500 is the electronic device 100, 300, for example. The electronic device 500 includes a controller 502 and a non-transitory machine-readable medium 504. The controller 502 is the controller 302, for example. The non-transitory machine-readable medium 504 is the storage device 306, for example.

In some examples, the controller 502 is coupled to the non-transitory machine-readable medium 504. In various examples, the non-transitory machine-readable medium 504 stores machine-readable instructions, which, when executed by the controller 502, cause the controller 502 to perform some or all of the actions attributed herein to the controller 502. The machine-readable instructions are the machine-readable instructions 506, 508.

In various examples, the machine-readable instructions 506, 508, when executed by the controller 502, cause the controller 502 to modify power levels of drivers (e.g., the drivers 308, 310, 312) for LEDs (e.g., the LEDs 314-336). The machine-readable instruction 506, when executed by the controller 502, causes the controller 502 to determine a difference between a first luminance value of LEDs in a first zone and a second luminance value of LEDs in a second zone, and, in response to the difference being equivalent to or greater than a threshold difference, cause a first driver circuit to provide a first non-zero power level to drive the LEDs in the first zone and a second driver circuit to provide a second power level to drive the LEDs in the second zone. The second power level is a non-zero multiplier of the first non-zero power level.

In some examples, the non-zero multiplier is a first non-zero multiplier. The machine-readable instructions, when executed by the controller 502, cause the controller 502 to determine a third zone has the second luminance value, where the third zone is contiguous to the second zone. The machine-readable instructions, when executed by the controller 502, cause the controller 502 to cause a third driver circuit to provide a third power level to drive LEDs in the third zone, where the third power level is a second non-zero multiplier of the first non-zero power level. In various examples, the second non-zero multiplier is greater than the first non-zero multiplier.

In other examples where the non-zero multiplier is a first non-zero multiplier, the machine-readable instructions, when executed by the controller 502, cause the controller 502 to determine a third zone has the second luminance value, where the third zone is contiguous to and disposed between the first zone and the second zone. The machine-readable instructions, when executed by the controller 502, cause the controller 502 to cause a third driver circuit to provide a third power level to drive LEDs in the third zone, where the third power level is a second non-zero multiplier of the first non-zero power level. In various examples, the second non-zero multiplier is less than the first non-zero multiplier.

In some examples, the machine-readable instructions, when executed by the controller 502, cause the controller 502 to determine a third zone has the second luminance value, where the third zone is contiguous to the first zone and the second zone. The machine-readable instructions, when executed by the controller 502, cause the controller 502 to cause a third driver circuit to provide the second power level to drive LEDs in the third zone.

In various examples, the machine-readable instructions, when executed by the controller 502, cause the controller 502 to determine a third zone has the first luminance value, where the third zone is contiguous to the first zone and the second zone. The machine-readable instructions, when executed by the controller 502, cause the controller 502 to cause a third driver circuit to provide the first non-zero power level to drive LEDs in the third zone.

Unless infeasible, some or all of the method 400 may be performed by the electronic device 100, 300, 500 concurrently or in different sequences and by circuity of the electronic device, execution of machine-readable instructions of the electronic device, or a combination thereof. For example, the method 400 is implemented by machine-readable instructions stored to a storage device (e.g., the storage device 306, the non-transitory machine-readable medium 504, or another storage device not explicitly shown) of the electronic device, circuitry (some of which is not explicitly shown), or a combination thereof. A controller (e.g., the controller 302, 502) of the electronic device executes the machine-readable instructions to perform some or all of the method 400, for example.

Utilizing the electronic device 100, 300, 500 that performs the method 400 reduces the halo effect without modifying the contrast ratio. Utilizing the electronic device 100, 300, 500 including the comparison circuit that modifies the power levels of different zones reduces the halo effect without modifying the contrast ratio. Reducing the halo effect enhances the image quality.

While some components are shown as separate components of the electronic device 300, 500, in other examples, the separate components are integrated in a single package. For example, the storage device 306 is integrated with the controller 302. The single package may herein be referred to as an integrated circuit (IC) or an integrated chip (IC).

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . " Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:

sets of light-emitting diodes (LEDs) arranged into zones;

multiple driver circuitries, a driver circuit of the multiple driver circuitries coupled to a set of LEDs of the sets of LEDs; and a comparison circuit coupled to the multiple driver circuitries, the comparison circuit to:

compare a first luminance value of a first set of LEDs of a first zone and a second luminance value of a second set of LEDs of a second zone, the first zone and the second zone contiguous; and in response to the comparison indicating that the first luminance value is greater than the second luminance value by a threshold difference, cause a first driver circuit to provide the first set of LEDs a first non-zero power level and a second driver circuit to provide the second set of LEDs a second power level, the second power level a non-zero multiplier of the first non-zero power level, the non-zero multiplier is greater than one, wherein providing the first set of LEDs the first non-zero power level drives the first set of LEDs at a first rate, wherein providing the second set of LEDs the second power level drives the second set of LEDs at a second rate, and wherein the second rate is faster than the first rate.

2. The electronic device of claim 1, wherein the comparison circuit comprises: a storage device storing machine-readable instructions; and a controller coupled to the storage device, wherein the machine-readable instructions, when executed by the controller, cause the controller to:

compare a third luminance value of a third set of LEDs of a third zone and the second luminance value of the second set of LEDs of the second zone, the second zone and the third zone contiguous; and in response to the comparison indicating that the second luminance value is greater than the third luminance value by the threshold difference, cause a third driver circuit to provide the third set of LEDs a third power level, the third power level a second non-zero multiplier of the second power level.

3. The electronic device of claim 1, wherein the comparison circuit is to:

determine a first average luminance value of a first set of pixels of the first zone to determine the first luminance value of the first set of LEDs of the first zone; and determine a second average luminance value of a second set of pixels of the second zone to determine the second luminance value of the second set of LEDs of the second zone.

4. The electronic device of claim 1, wherein the comparison circuit is to:

determine a specified number of luminance values of pixels of the first zone are equivalent to or greater than a brightness threshold; and in response to a determination that the specified number of luminance values of the pixels of the first zone are equivalent to or greater than the brightness threshold, the comparison circuit uses the brightness threshold as the first luminance value for the first zone.

5. The electronic device of claim 1, wherein the comparison circuit is to:

determine a specified number of luminance values of pixels of the second zone are equivalent to or less than a dimness threshold; and in response to a determination that the specified number of luminance values of the pixels of the second zone are equivalent to or less than the dimness threshold, the comparison circuit uses the dimness threshold as the second luminance value for the second zone.

6. The electronic device of claim 1, wherein the first non-zero power level is greater than a target power level that enables first pixels of the first zone to display at least a portion of an image;

wherein the second power is greater than the target power level that enables second pixels of the second zone to display at least a portion of the image.

7. The electronic device of claim 1, wherein the non-zero multiplier is at least 1.25.

8. The electronic device of claim 7, wherein the non-zero multiplier is at least 1.5.

9. A method, comprising:

determining differences between luminance values of light-emitting diodes (LEDs) in multiple contiguous zones;

determining whether a first difference of the differences is equivalent to or greater than a threshold difference, the first difference between a first zone and a second zone of the multiple contiguous zones; and in response to the first difference being equivalent to or greater than the threshold difference, providing by a first driver circuit a first non-zero power level to drive LEDs in the first zone and providing by a second driver circuit a second non-zero power level to drive LEDs in the second zone, the second non-zero power level being greater than the first non-zero power level.

10. The method of claim 9, comprising:

in response to the first difference being less than the threshold difference, determining whether a second difference of the differences is equivalent to or greater than the threshold difference, the second difference between a third zone and a fourth zone of the multiple contiguous zones;

and in response to the second difference being equivalent to or greater than the threshold difference, providing by a third driver circuit the first non-zero power level to LEDs in the third zone and providing by a fourth driver circuit the second non-zero power level to drive LEDs in the fourth zone.

11. The method of claim 10, comprising:

in response to the second difference being less than the threshold difference, determining whether a third difference of the differences is equivalent to or greater than the threshold difference, the third difference between the first zone and the third zone of the multiple contiguous zones; and in response to the third difference being equivalent to or greater than the threshold difference, providing by the third driver circuit the second non-zero power level to drive the LEDs in the third zone and providing by the first driver circuit the first non-zero power level to drive the LEDs in the first zone.

12. The method of claim 11, comprising:

providing by the fourth driver circuit the second non-zero power level to drive the LEDs in the fourth zone.

13. The method of claim 11, comprising:

determining whether a fourth difference of the differences is equivalent to or greater than the threshold difference, the fourth difference between the first zone and the fourth zone of the multiple contiguous zones; and in response to the fourth difference being less than the threshold difference, providing by the fourth driver circuit a third non-zero power level to drive the LEDs in the fourth zone, the third non-zero power level between the first non-zero power level and the second non-zero power level.

14. The method of claim 9, wherein providing the first driver circuit the first non-zero power level drives the LEDs in the first zone at a first rate;

wherein providing the second driver circuit the second non-zero power level drives the LEDs in the second zone at a second rate;

wherein the second rate is faster than the first rate.

15. A non-transitory machine-readable medium storing machine-readable instructions, which, when executed by a controller of an electronic device, cause the controller to:

determine a difference between a first luminance value of light-emitting diodes (LEDs) in a first zone and a second luminance value of LEDs in a second zone; and in response to the difference being equivalent to or greater than a threshold difference, cause a first driver circuit to provide a first non-zero power level to drive the LEDs in the first zone and a second driver circuit to provide a second power level to drive the LEDs in the second zone, the second power level a non-zero multiplier of the first non-zero power level, the non-zero multiplier is greater than one.

16. The non-transitory machine-readable medium of claim 15, wherein the non-zero multiplier is a first non-zero multiplier, and wherein the machine-readable instructions, when executed by the controller, cause the controller to:

determine a third zone has the second luminance value, the third zone contiguous to the second zone; and cause a third driver circuit to provide a third power level to drive LEDs in the third zone, the third power level a second non-zero multiplier of the first non-zero power level, wherein the second non-zero multiplier is greater than the first non-zero multiplier.

17. The non-transitory machine-readable medium of claim 15, wherein the non-zero multiplier is a first non-zero multiplier, and wherein the machine-readable instructions, when executed by the controller, cause the controller to:

determine a third zone has the second luminance value, the third zone contiguous to and disposed between the first zone and the second zone; and cause a third driver circuit to provide a third power level to drive LEDs in the third zone, the third power level a second non-zero multiplier of the first non-zero power level, wherein the second non-zero multiplier is less than the first non-zero multiplier.

18. The non-transitory machine-readable medium of claim 15, wherein the machine-readable instructions, when executed by the controller, cause the controller to:

determine a third zone has the second luminance value, the third zone contiguous to the first zone and the second zone; and cause a third driver circuit to provide the second power level to drive LEDs in the third zone.

19. The non-transitory machine-readable medium of claim 15, wherein the machine-readable instructions, when executed by the controller, cause the controller to:

determine a third zone has the first luminance value, the third zone contiguous to the first zone and the second zone; and cause a third driver circuit to provide the first non-zero power level to drive LEDs in the third zone.

20. The non-transitory machine-readable medium of claim 15, wherein providing the first driver circuit the first non-zero power level drives the LEDs in the first zone at a first rate;

wherein providing the second driver circuit the second power level drives the LEDs in the second zone at a second rate;

wherein the second rate is faster than the first rate.

* * * * *